United States Patent [19]

Davis

[11] 4,262,697

[45] Apr. 21, 1981

[54] AIR VALVE AND PRESSURE RESPONSIVE ACTUATOR

[76] Inventor: Allen V. C. Davis, 5600 Alta Canyada Rd., La Canada, Calif. 91011

[21] Appl. No.: 930

[22] Filed: Jan. 4, 1979

[51] Int. Cl.³ .............................................. F16K 11/04
[52] U.S. Cl. ............................. 137/625.5; 137/625.27; 137/625.66
[58] Field of Search ............ 137/625.27, 625.5, 625.66

[56] References Cited

U.S. PATENT DOCUMENTS 4,165,762   8/1979   Acar ........................... 137/625.65 X

*Primary Examiner*—Gerald A. Michalsky

[57] ABSTRACT

A valve body has a chamber in which a ball is located, the chamber portion occupied by the ball being exposed to a working port that is to be switched between a high pressure inlet port and an exhaust port. The ball is located between valve seats, and a diaphragm at the end of the chamber portion to which one port is connected is movable with the ball via an internal pin and external strap arrangement to move the ball against one or the other of the valve seats. In an arrangement wherein the one chamber is exposed to the high pressure inlet port, in the closed position of the valve the area of the diaphragm is only slightly greater than that of the ball circumscribed by the adjacent valve seat. In the open position, the area of the diaphragm is only slightly less than that of the ball circumscribed by the other valve seat. Via a pressure responsive device coupled to the external strap, and operable with a snap action disc spring, a few ounces of force applied to the strap will move the ball against one or the other of the valve seats, and the ball remains in such position and effects communication between the working port and either the high pressure inlet port or the exhaust port. A switch is also actuated in one embodiment. In other arrangements, diaphragm to valve seat area parameters are selected so the ball is normally seated against one valve seat and is moved via the strap against the other valve seat. In such monostable arrangements, the ball and diaphragm are automatically returned to the normal position when the force on the strap is removed.

2 Claims, 7 Drawing Figures

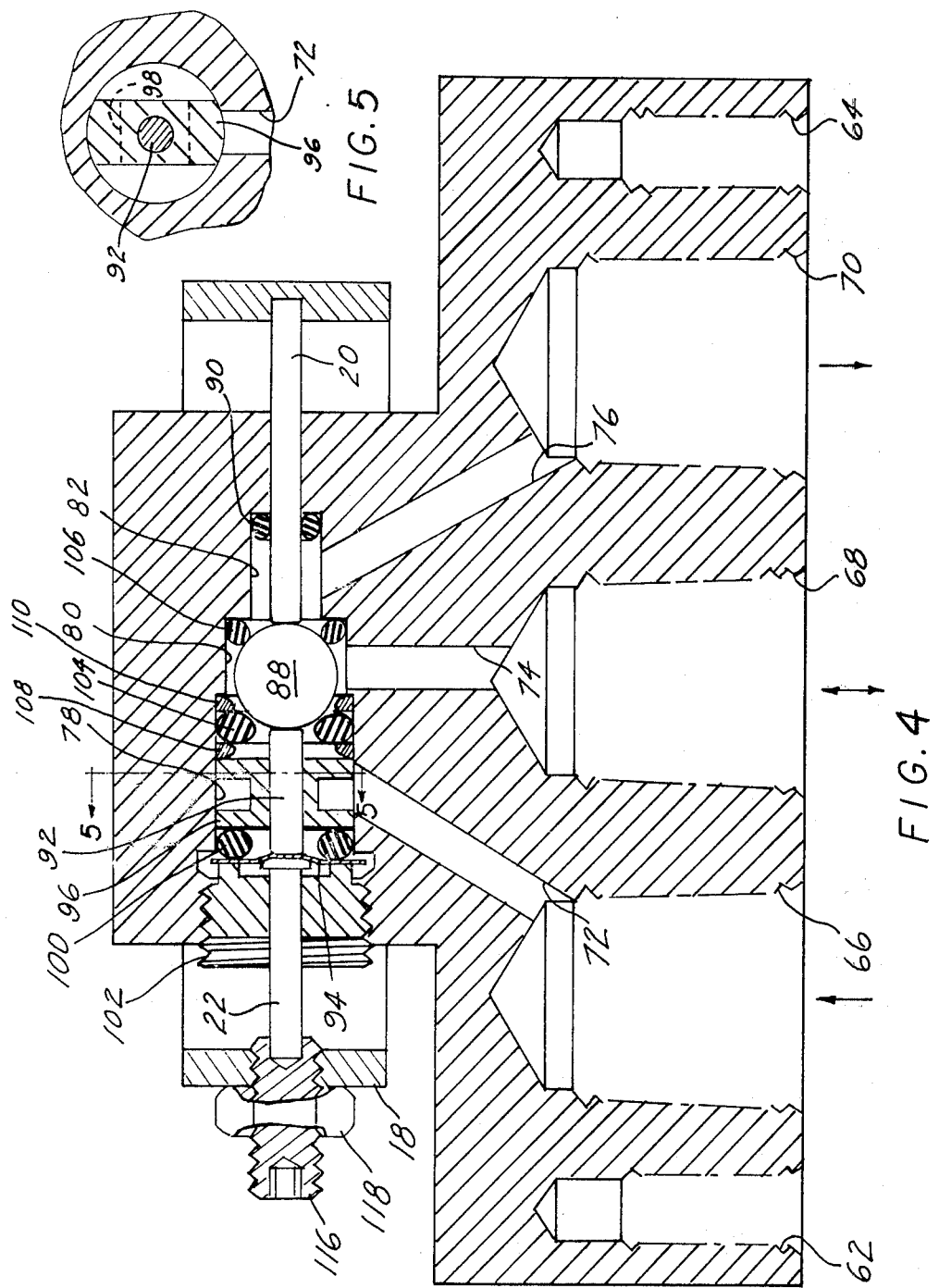

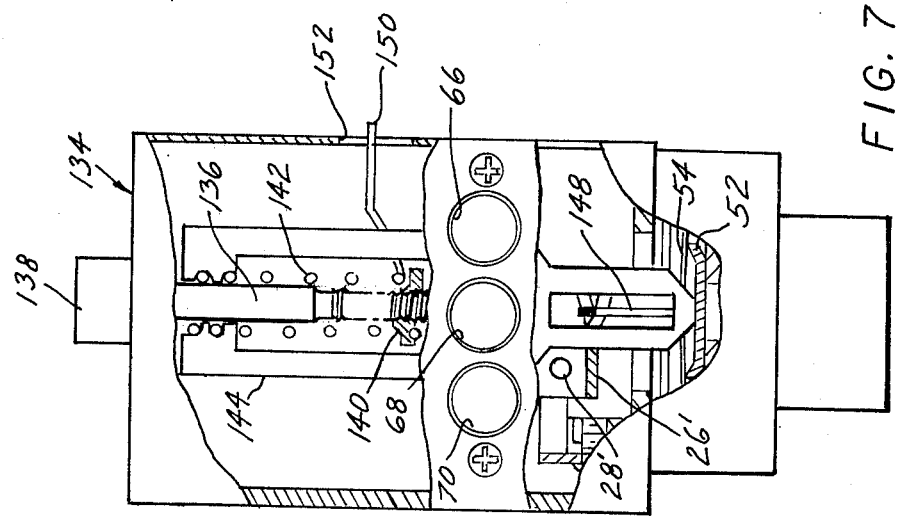
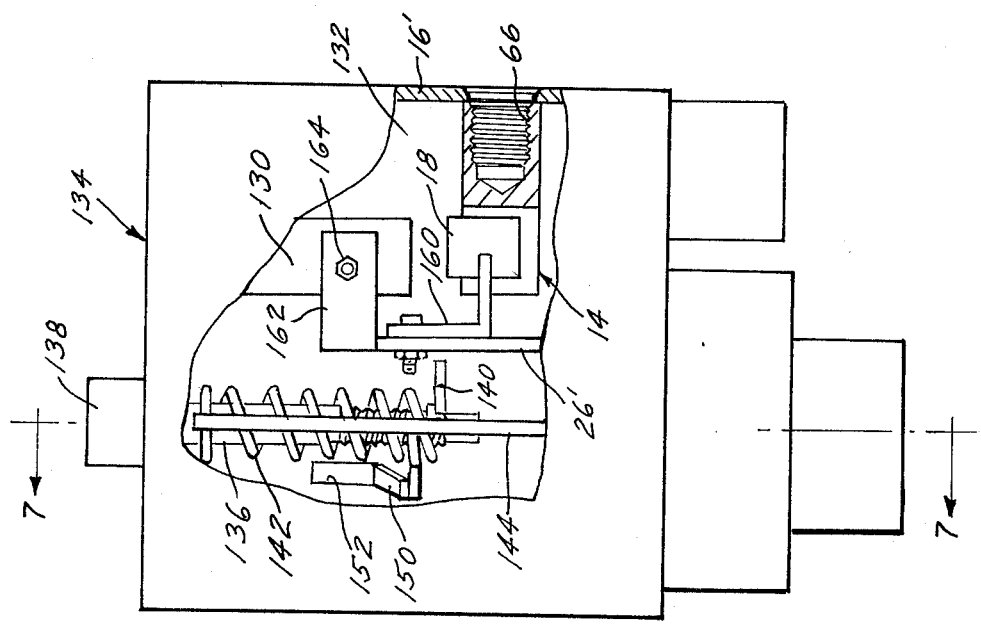
FIG. 7
FIG. 6

AIR VALVE AND PRESSURE RESPONSIVE ACTUATOR

BACKGROUND OF THE INVENTION

1. Field of the Invention

This invention relates to valve structures.

2. Description of the Prior Art

It has heretofore been known to operate devices via mechanical movements in apparatus which responds to predetermined changes in pressure of fluid applied thereto. See, for example, my U.S. Pat. No. 2,824,919 for "Pressure Responsive Switch," issued Feb. 25, 1958, and U.S. Pat. No. 3,577,793 for "Mechanical Motion Transmitter," issued May 4, 1971. In such apparatus, mechanical movements include a snap action disc spring for operating a movable element such as a pointer or a microswitch plunger. Such elements require very small forces in terms of grams or ounces to effect their operation. Accordingly, the pressure responsive device can be operated with a desired narrow deadband, i.e., the difference between the fluid pressure causing the spring to snap in one direction and the fluid pressure at which the spring snaps back in the opposite direction. Such deadband must be kept narrow in order to maintain high sensitivity in controlling systems. However, this has not been possible with known valve structures that require substantial forces to actuate and reactuate a system, and cannot be driven by such sensitive actuating devices.

SUMMMARY OF THE INVENTION

This invention embraces a poppet type valve utilizing a dual balancing diaphragm which may be selected to make the valve a bistable device in which the poppet may be put in either position with a minimum of force, or to make it a monostable device in which the poppet is movable from a normal position to its other position with a minimum of force and returns automatically to its normal position upon removal of force, and which is of simple design and rugged construction capable of inexpensive manufacture, assembly and maintenance, and which is inherently reliable. Included is a valve body with spaced passages to an elongated chamber, wherein a ball and valve seats are located in the middle portion of the chamber exposed to the middle passsage, a diaphram covers the end of one outer chamber portion, and an internal pin and external saddle arrangement is adapted to move the diaphragm and ball, wherein the change in the effective area of the diaphragm from one extreme position to the other is substantially balanced by the area of the ball circumscribed by the valve seat for each respective position with a slight unbalance in areas to provide seating pressure. Also embraced are such valve and pressure responsive devices in which the saddle is actuated by coupling to a snap action disc spring.

BRIEF DESCRIPTION OF THE DRAWINGS

FIG. 4 is a longitudinal sectional view of the air valve of the invention;

FIG. 5 is a fragmentary sectional view taken along the line 5—5 of FIG. 4;

FIG. 6 is a side elevation view, partly broken away, of a pressure responsive switch and air valve combination of the invention; and FIG. 7 is a fragmentary longitudinal sectional view taken along the line 7—7 of FIG. 6.

DESCRIPTION OF ILLUSTRATIVE EMBODIMENTS

Figure 1:
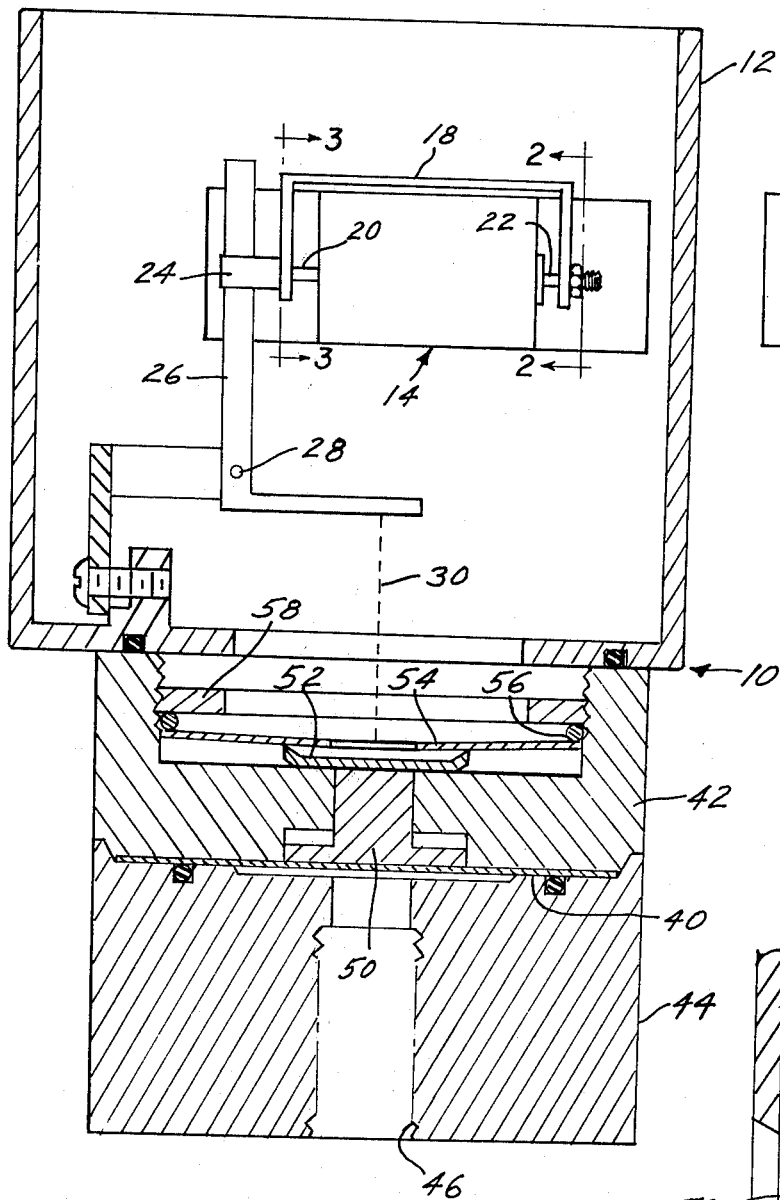
FIG. 1 is a longitudinal sectional view of a pressure responsive device for actuating an air valve in accordance with this invention.

FIG. 1 shows a pressure responsive device 10 having an upper body portion 12 which houses an air valve 14 that is secured to the rear wall 16 thereof. The air valve 14 is adapted to be actuated via operation of an external saddle or U-shaped strap member 18 that engages the external ends of pin 20, 22 extending from the valve body.

As shown, the saddle 18 is secured via a connector strap 24 to a lever 26. The lever is pivoted at 28, and is adapted for actuation by a pressure responsive device that is coupled thereto through the lower wall of the upper body portion 12, such coupling being indicated at 30. In this regard, the pressure responsive device shown includes a diaphragm 40 that is clamped between an upper body portion 42 and the lower cap portion of a ported body 44. The ported body 44 has a port 46 spanned by the diaphragm 40, and through which fluid under pressure is adapted to be applied to the lower surface of the diaphragm 40.

Resting on the upper surface of the diaphragm, and adapted for limited slidable movement in the body portion 42, is a pressure plate 50 which has its upper end contacting a register plate 52. The register plate 52 has a relatively sharp upper rim on which is placed the body of a snap action disc spring 54. Via a ring 56 bearing against the outer peripheral portion of the snap spring 54, and an adjusting nut 58, the snap spring is suitably preloaded to insure snap action upon the pressure of fluid in the port 46, and applied to the lower surface of the diaphragm 40, reaching a predetermined level. Desirably, the spring snaps back upon the pressure of the fluid falling to a lower predetermined level, and the difference between the two pressure levels represents a predetermined narrow deadband.

As indicated at 30, the lever is coupled to the inner edge of the snap spring 54, so that movement of the spring in one direction effects movement of lever 26 to cause movement of the saddle 18 and the pins 20, 22 to the right in FIG. 1, and return snap movement of the spring 54 effects reverse movement of the lever to cause the saddle and pins to move to the left in FIG. 1. The coupling 30 for effecting such operations of the lever 26 from movements of the disc spring 54 may be effected by any desired structure, e.g., as illustrated in the aforesaid patents, by which to effect pivotal movement of an element when such a spring undergoes snap movement.

Figure 2:
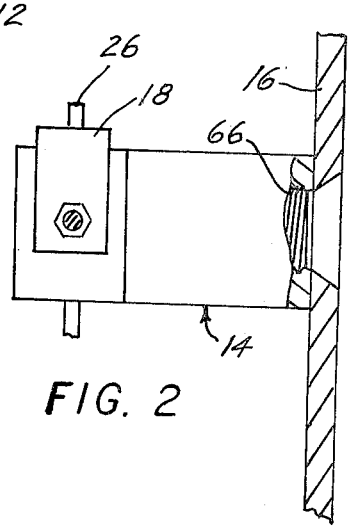
FIG. 2 is a fragmentary sectional view taken along the line 2—2 of FIG. 1.
Figure 3:
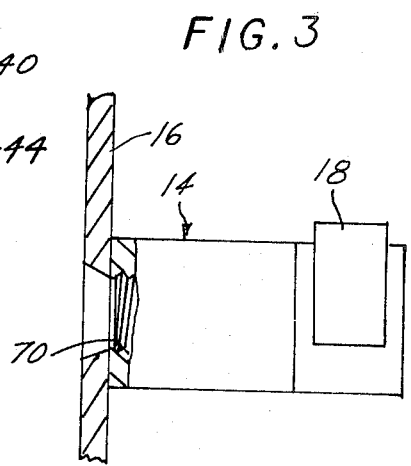
FIG. 3 is a fragmentary sectional view taken along the line 3—3 of FIG. 1.

FIGS. 2 and 3 show the body of the air valve 14 extending inward from the wall 16 of the housing 12, and FIGS. 4 and 5 show construction of the air valve. As illustrated, the air valve body is tapped as at 62, 64 to facilitate fastening it to the wall 16. Also shown to receive fittings are threaded ports 66, 68, 70 which are connected via respective passages 72, 74, 76 to respective portions 78, 80, 82 of a valve chamber.

A ball 88 is located in the middle portion 80 of the valve chamber. The pin 20 at its inner end engages the ball 88, and such pin slidably extends through the valve body to its exterior, an O-ring 90 being provided as indicated for sealing purposes. Also, a pin 92 in the left chamber portion 78 engages the ball at one end, and its other end engages a diaphragm member 94, which is captured between such pin 92 and the inner end of the pin 22. Preferably, the inner end of the pin 22 is enlarged and beveled so as to present no sharp edge to the body of the diaphragm 94, which is a thin member, e.g., a plastic element such as H-film approximately 0.002-in. thick.

The diaphragm 94 is one that has a fabric-type memory, i.e., its area is self-supporting as distinguished from a rubber diaphragm that stretches as it moves. The diaphragm 94 thus has a predictable change in area with movement, which movement is quite small, e.g., 0.010-in. travel between concave and convex positions with respect to the pressure chamber.

The pin 92 is supported for axial movement in the bore of a spider element 96, such element having a groove 98 so that, as will be seen by inspection of FIGS. 4 and 5, fluid communication between the port 66 and the exposed surfaces of the ball 88 and the diaphragm is assured. In this latter regard, an O-ring 100 is located between the peripheral edge surface portions of the diaphragm 94 and the spider 96. The O-ring 100 is held snug and in sealing contact with the diaphragm and spider via an adjusting nut member 102.

An O-ring 104 is held in position so as to sealingly engage the ball 88 when the ball is subjected to a thrust to the left in FIG. 4. Similarly, an O-ring 106 is held in position so as to sealingly engage the ball when it is thrust to the right in FIG. 4. The O-ring 104 is shown located between stationary rings 108, 110, although it will be understood that retention of such O-ring in place can be effected by provision of a recess in the valve body in lieu of such rings 108, 110. The O-ring 106 desirably may also be located in such a recess.

The outer end of the pin 22 is shown extending into a threaded adjusting member 116 that extends through one end of the saddle 18, and about which is threaded a nut 118 adapted to be brought against the outer surface of the saddle. The adjusting member 116 is adjusted to a point where the pins 20, 92, 22 and the ball 88 are held so that the inner ends of the pins 20, 92 abut the ball, and the nut 118 secures the parts in such relation. In this matter, the parts are not substantially compressed via the saddle and adjusting members. Rather, only that force is present which holds the parts in the aforementioned firm touching relation, so that any movement of the saddle is imparted to the ball.

Let it be assumed that the port 68 is connected to a device to be operated selectively via the valve structure above described, such as an air cylinder in a system in which a source of relatively high pressure air, e.g., at 100-psi, is connected to the port 66. The port 70 is the exhaust port. Movement of the ball 88 to the right effectively breaks sealing engagement with the O-ring 104, and causes sealing by the O-ring 106. This allows air to pass through the passage 74 to the port 68, and hence the air cylinder becomes connected to the source pressure.

When the ball 88 is moved to the left, the O-ring 104 sealingly engages the ball and the seal with the O-ring 106 is broken. The air cylinder is thus connected to the exhaust via the port 68, passage 74, the chamber portions 80, 82 and passage 76 and the port 70. Thus, the valve is in the closed position when the ball is moved to the left, and is in the open position when the ball is moved to the right.

However, it is essential for bistability that the effective area of the diaphragm exposed to the source pressure be properly selected with respect to the areas of the ball circumscribed by the O-rings 104, 106. In the closed position, the effective area of the diaphragm exposed to such pressure is slightly greater than the area of the ball that is circumscribed by the O-ring 104. In the open position, the effective area of the diaphragm exposed to such pressure is slightly less than the area of the ball that is circumscribed by the O-ring 106.

In this regard, the diaphragm 94 has the unique quality or characteristic of such fabric type diaphragms that its effective area, i.e., the force it supports, varies with its deflected position. The effective area is greatest where the diaphragm forms a convex wall (wherein the saddle moves the parts to the right), and is less where the diaphragm is concave (wherein the parts are moved to the left). This invention utilizes this quality to effect the desired stability of operation of the valve.

Thus, when the disc spring is snapped to cause the saddle and valve elements to move to the left, the diaphragm has a change in effective area and a resulting force change with the motion. In this regard, during movement of the diaphragm to the left, the area and resulting force are just sufficiently great enough to cause the O-ring 104 to be firmly seated against the ball and thereby close off communication between the ports 66 and 68. This insures that the force to snap the saddle and valve elements to the left may be quite small, e.g., of the order of six to eight ounces, and the valve parts are maintained in such position by virtue of this force-area relationship. If the source pressure should vary, such variations will not subject the valve system to return movement, but the parts will remain in position until subjected to an external force to move them to the right.

When the disc spring snaps to apply a small force for effecting movement of the valve system to the right, the area of the ball 88 circumscribed by the O-ring 106 is greater than the effective diaphragm area, and thereby effects sealing. This relationship aids and maintains the O-ring 106 in sealing engagement with the ball, and thereby effects communication from the source pressure port 66, through the O-ring 104 past the ball and through the passage 74 to the port 68 and the air cylinder. Thus, the parts will remain in this position until subjected to an external force to move them to the left.

The particular valve structure above described has distinct advantages attributed to the manner in which the valve parts are held together and actuated. Internal biasing or return springs are completely eliminated, and wide tolerances are permissible in the assembly of parts without affecting their desired operations. The ball 88 is able to rotate about any axis without the abutting pins being out of contact therewith, and without affecting the desired sealing of the O-ring 104, 106 with the ball or the areas of the ball circumscribed by such valve seats. However, this invention also embraces the valve structure wherein the pins 20, 92 and the ball 88 are combined in one part, since such a unitary arrangement of these elements will not change the mode of operation of the valve.

Referring to FIGS. 6 and 7, a pressure responsive device is shown wherein the valve 14 is adapted to be operated simultaneously with another device 130. The device 130 may be another such valve, a switch, or a meter pointer, and is secured to a wall 132 in a manner similar to that in which the valve 14 is secured to the wall 16'. The mechanism of the pressure responsive device illustrated in FIGS. 6 and 7 is described in great detail in my copending application, Fluid Pressure Responsive Device, U.S. Ser. No. 801,336, filed May 27, 1977, now U.S. Pat. No. 4,137,434, to which reference may be made for such details not presented here. For present purposes, only so much of the structure is described as will aid the description of the added parts and operations of the present invention.

Extending through the top of the housing 134 is a rod 136 which is slotted at the upper end to permit use of a tool to turn it, such upper end being protected by a cap 138. The rod 136 is threaded along its inner half, on the lower end of which is threaded a nut 140. A helical spring 142 located over the rod 136 has its bottom turn captured by the nut 140 and its upper portion captured by a yoke member 144. The lower end of the yoke member 144 is secured to the center of the register plate 52, and a fulcrum member 148 attached to the inner peripheral edge of the disc spring 54 is attached to fingers which extend from the lever 26'. Thus, when the rod 136 is turned in one direction the nut moves towards the external end of the rod and thereby places the coils of the helical spring 142 in compression. Turning the rod in the opposite direction causes the nut to carry the lower end of the helical spring to the lower end of the rod 136, thereby placing the helical spring in tension. The rod is turned to place the spring in tension when the pressure responsive device is to be operated at high pressures, and in compression when the device is to be operated at low pressures. The deadband at all such pressure levels is substantially the same. Visually, the pressure level is selected via a pointer 150 in a face plate on which pressure settings are inscribed (not shown).

The lever 26' is shown in FIG. 6 to carry a strap 160 that is attached to one end of the saddle 18, and a strap 162 that is adjusted at 164 to actuate the valve or other device 130. It will be recognized that if the device 130 is a valve like the valve 14, both such valves can be placed on the same wall, in which case therir saddles are end to end. By connecting the confronting saddle ends together, the connection of the lever 26' to one saddle affects simultaneous operation of both valve systems.

While this invention has been described with reference to the valve operations that are bistable, this invention also embraces operations of the structure that are monostable. Thus, the diaphragm and valve seat areas may be sufficiently mismatched to establish a normally open valve. For such normally open condition, movement of the poppet to the left causes the valve to close, and upon removal of the force that causes such movement the poppet automatically returns to the right, or open, position. Similarly, the force-area relation may be chosen so the valve is normally closed. For this normally closed condition, movement of the poppet to the right causes the valve to open, and upon removal of the force that causes such movement the poppet automatically returns to the left, or closed, position. In such valve operations, the parts are the same as above described for the bistable valve. Again, no internal biasing or return spring is needed. The only difference is that the applied external force on the saddle must be maintained for the period in which it is desired that the position to which the ball is moved from normal position is held.

I claim:

1. In combination:
a body having an elongated chamber therein,
   said body having spaced passages in fluid communication with the middle and end portions of said chamber;
valve seats at the ends of the middle chamber portion;
a diaphragm spanning the outer part of one of the end portions of said chamber;
a poppet between said valve seats;
and means including a member outside said body for effecting movement of said poppet into engagement with one of said valve seats, and causing said diaphragm to move with said poppet,
said means including a first pin extending through said one end chamber portion between said diaphragm and said poppet,
a second pin extending through the remaining end chamber portion from the poppet to the exterior of said body,
a third pin extending from said diaphragm to the exterior of said body,
said outside member having ends engaging the outer ends of said second and third pins,
said outside member including adjustment means engaging the outer end of said third pin;
and means for locking said adjustment means in position after operation thereof to cause the inner ends of said first and second pins to engage said poppet,
said diaphragm assuming a concave form when moved in one direction with said poppet, and a convex form when moved in the opposite direction with said poppet,
said diaphragm in its concave form having an effective area approximately equal to the area of said poppet circumscribed by the nearest valve seat,
and said diaphragm in its convex form having an effective area approximately equal to the area of said poppet circumscribed by the other valve seat,
the effective area of said diaphragm being sufficiently different from that of the poppet area circumscribed by the one of said valve seats to cause said poppet to remain sealingly engaged by such one valve seat until force is exerted on said outside member to move said poppet away from such one valve seat.

2. The combination of claim 1, including a spider in said one end chamber portion for supporting said fist pin for axial movement;
a ring seal between said spider and said diaphragm; and an adjusting member around said third pin and in
slidable engagement therewith,
   said ajusting member being threaded in said body and having a portion engaging the edge surface of said diaphragm, said adjusting member being turned to a position to sandwich said ring seal between said spider and diaphragm with sufficient force to effect a fluid-tight seal and balance the diaphragm and seal forces.

* * * * *